US006147849A

United States Patent [19]

Wullink

[11] Patent Number: 6,147,849

[45] Date of Patent: Nov. 14, 2000

[54] MULTICHANNEL IGNITION CIRCUIT

[75] Inventor: Gerhard Wullink, Loveland, Colo.

[73] Assignee: DaimlerChrysler Corporation, Auburn Hills, Mich.

[21] Appl. No.: 09/212,163

[22] Filed: Dec. 15, 1998

[51] Int. Cl.[7] ........................................ H02H 3/06

[52] U.S. Cl. .................... 361/93.9; 361/169.1; 123/622; 123/623

[58] Field of Search ................................ 361/93.1, 93.2, 361/93.7, 93.9, 31, 170, 186, 187, 166, 168.1, 169.1; 123/210, 618, 621, 622, 623, 632, 636

[56] References Cited

U.S. PATENT DOCUMENTS

| | | | |
|---|---|---|---|
| 4,497,306 | 2/1985 | Hamai et al. | 123/620 |
| 5,239,973 | 8/1993 | Murata et al. | 123/635 |
| 5,307,786 | 5/1994 | Murata et al. | 123/635 |
| 5,373,826 | 12/1994 | Taruya et al. | 123/634 |
| 5,623,912 | 4/1997 | Kelly | 123/644 |
| 5,642,253 | 6/1997 | Shreve | 361/152 |

*Primary Examiner*—Ronald W. Leja
*Attorney, Agent, or Firm*—Roland A. Fuller, III

[57] ABSTRACT

A multichannel ignition circuit for controlling a supply of current to a plurality of ignition coils for use with an internal combustion engine. Each of the ignition coils includes a primary coil and a secondary coil. A controller generates the plurality of ignition timing pulses. A driving/switching circuit having a plurality of drivers are operable to be turned on upon receipt of one of the ignition timing pulses from the controller. Each of the ignition coils is operable to generate a firing voltage upon one of the drivers being turned on. A current limiting circuit is operable to regulate an amount of current through each of the ignition coils when the internal combustion engine is operating below a threshold. A peak voltage reduction circuit which forms a portion of the current limiting circuit is operable to reduce voltage peaks in each of the ignition coils when the current limiting circuit is regulating the amount of current through each of the ignition coils and one of the ignition timing pulses is on.

9 Claims, 5 Drawing Sheets

MULTICHANNEL IGNITION CIRCUIT

BACKGROUND OF THE INVENTION

1. Field of the Invention

This invention relates generally to an ignition circuit for an internal combustion engine and, more particularly, to a multichannel ignition circuit for controlling the supply of current through a plurality of ignition coils when the internal combustion engine is operating at low RPM.

2. Discussion of the Related Art

In recent years, electronic ignition systems controlled by a microprocessor or control computer have been introduced into automotive vehicles. Because of this, complex mechanical parts have generally been replaced with solid state components that allow the microprocessor or control computer more precise control on the operation of the internal combustion engine.

In order to control the amount of current through the ignition coils in the ignition system, as well as the timing of the ignition firing sequence, the velocity of the flywheel in the internal combustion engine is generally monitored. At high RPM (revolutions per minute), generally greater than about 600 RPM, a predictable flywheel velocity enables proper timing for driving the ignition coils, as well as predictability on the amount of current flowing through the ignition coils. At lower RPM, generally less than about 600 RPM, unpredictable flywheel velocity occurs.

This unpredictability is a result of the flywheel not being heavy enough to operate at a constant angular velocity at lower RPM levels. Because of this, the control computer artificially causes the beginning of the timing pulses to occur earlier so as to ensure a high enough current level through the ignition coils for the firing sequence. However, since the velocity of the flywheel is unpredictable below 600 RPM, it is difficult to determine when top dead center (TDC) of a particular piston in a cylinder in the internal combustion engine is going to occur. This unpredictability may potentially cause the current in the ignition coils to be driven to high enough levels that could damage the ignition coils.

To prevent damage to the ignition coils, current limiting circuits are generally used to limit the current through the ignition coils. Generally, a current limiting circuit is used for each cylinder or ignition coil, thereby providing multiple current limiting circuits within the ignition system. This duplicated circuitry increases the overall cost, weight and complexity of the ignition circuit. The current limiting circuits in general may also cause early firing within a particular cylinder due to false voltage spikes or voltage peaks. Such voltage peaks are transferred through the primary windings of the ignition coil and subsequently amplified in the secondary windings to voltage levels which may cause early firing before top dead center (TDC) occurs.

What is needed then is a multichannel ignition circuit which does not suffer from the above-mentioned disadvantages. This will, in turn, provide a multichannel ignition circuit which reduces the overall weight, cost and complexity of the ignition circuit; replaces duplicated current limiting circuits with a single current limiting circuit that supports multiple channels; and provides peak voltage reduction circuitry to substantially eliminate any false voltage peaks within the ignition coils, thereby substantially reducing any misfiring. It is, therefore, an object of the present invention to provide a multichannel ignition circuit which improves upon the current deficiencies in existing ignition circuits.

SUMMARY OF THE INVENTION

In accordance with the teachings of the present invention, a multichannel ignition circuit for controlling a supply of current to a plurality of ignition coils for use with an internal combustion engine is provided. The multichannel ignition circuit utilizes a single current limiting circuit for multiple ignition coils, as well as a peak voltage reduction circuit to reduce false voltage peaks in the ignition coils.

In one preferred embodiment, a multichannel ignition circuit for controlling a supply of current to a plurality of ignition coils for use with an internal combustion engine includes a controller that is operable to generate a plurality of ignition timing pulses. A driving/switching circuit having a plurality of drivers are operable to be turned on upon receipt of one of the ignition timing pulses from the controller. Each of the ignition coils is operable to generate a firing voltage upon one of the drivers being turned on. A current limiting circuit is operable to regulate the amount of current through each of the ignition coils when the internal combustion engine is operating below a threshold. A peak voltage reduction circuit forms a portion of the current limiting circuit and is operable to reduce voltage peaks in each of the ignition coils when the current limiting circuit starts to regulate the amount of current through each of the ignition coils and one of the ignition timing pulses is on.

Use of the present invention provides a multichannel ignition circuit that controls the supply of current to a plurality of ignition coils having a primary coil and a secondary coil. As a result, the aforementioned disadvantages associated with the current ignition circuits for use with internal combustion engines have been substantially reduced or eliminated.

BRIEF DESCRIPTION OF THE DRAWINGS

Still other advantages of the present invention will become apparent to those skilled in the art after reading the following specification and by reference to the drawings in which.

DETAILED DESCRIPTION OF THE PREFERRED EMBODIMENT(S)

The following description of the preferred embodiments concerning a multichannel ignition circuit for use with an internal combustion engine in an automotive vehicle is merely exemplary in nature and is not intended to limit the invention or its application or uses. Moreover, while the invention is described in detail below with respect to six ignition coils for a six cylinder internal combustion engine, those skilled in the art will recognize that the multichannel ignition circuit may be employed with various other internal combustion engines having any number of cylinders, as well as internal combustion engines which employ a separate ignition coil for each cylinder or a separate ignition coil used within a pair of cylinders.

Figure 1:
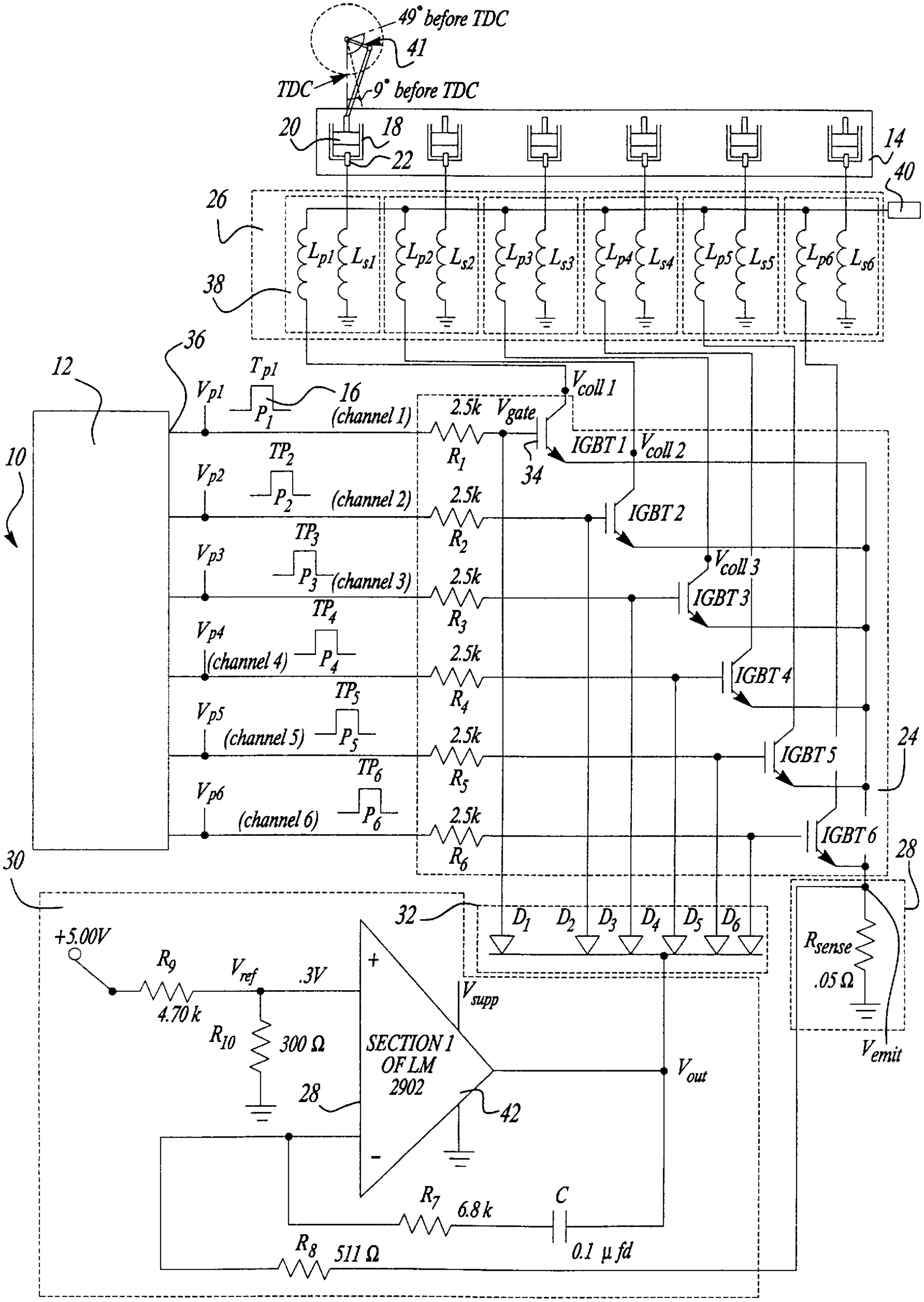
FIG. 1 is a detailed schematic block diagram of a multichannel ignition circuit according to the teachings of a first preferred embodiment of the present invention.

Referring to FIG. 1, a detailed schematic block diagram of a multichannel ignition circuit 10 is shown. The multichannel ignition circuit 10 includes a microprocessor or controller 12, such as a Motorola M68HC16 microprocessor. The controller 12 performs many engine control functions including controlling the ignition firing sequence of the internal combustion engine 14, via timing pulses 16 ($T_{p1}$, $T_{p2}$, . . . , $T_{p6}$). The internal combustion engine 14 is shown having six (6) cylinders 18, with each cylinder 18 including a piston 20 and spark plug 22 and a crankshaft 41. The multichannel ignition circuit 10 further includes a driver/switching circuit 24, a firing circuit 26, a voltage sense circuit 28, a current limiting circuit 30 and a channel selection circuit 32.

The driver/switching circuit 24 includes a plurality of drivers or transistors 34 corresponding to the number of cylinders 18 in the internal combustion engine 14. Each transistor 34 is preferably an insulated gate bipolar transistor 34 ($IGBT_1$, $IGBT_2$, . . . , $IGBT_6$). A current limiting resistor R1–R6 is coupled between each gate of each transistor 34 and each buffered output 36 of the controller 12. The current limiting resistors together with the diodes 32 (D1–D6) form voltage dividers, (one divider per channel). The purpose any one divider is to limit the current through its corresponding coil 38, IGBT 34 and sense resistor 28 ($R_{sense}$) once the current through the coil has attained a certain level. The dividers only operate when the length of the pulses 16 ($T_{p1}$–$T_{p6}$) are set to a fixed number of degrees of the crankshaft 41; that is below 600 RPM.

Coupled to each collector of each transistor 34 is the ignition coil 38 within the firing circuit 26. Each ignition coil 38 includes a primary ignition coil ($L_{p1}$, $L_{p2}$, . . . , $L_{p6}$) and a secondary ignition coil ($L_{s1}$, $L_{s2}$, . . . , $L_{s6}$). Each primary ignition coil ($L_{p1}$, $L_{p2}$, . . . , $L_{p6}$) is about 2 mH and is coupled to the vehicle battery 40 which provides a battery voltage ($V_{batt}$) of approximately 13.5 volts nominally. Each secondary ignition coil ($L_{s1}$, $L_{s2}$, . . . , $L_{s6}$) is about 20 H and is coupled to a spark plug 22 within cylinder 18 of the internal combustion engine 14. Each emitter of each transistor 34 is coupled to the voltage sense circuit 28. The voltage sense circuit 28 includes the resistor $R_{sense}$ (0.04Ω) which is used to monitor the amount of current passing through the particular primary ignition coil ($L_{p1}$, $L_{p2}$, . . . , $L_{p6}$) when the particular transistor 34 is turned on or in saturation.

The current limiting circuit 30 includes an operational amplifier (op-amp) 42 that is configured as an integrator having a resistor R7 (6.8 KΩ) and a capacitor C (0.1 μF) feedback loop. The op-amp 42 is preferably an LM 2902 operational amplifier which is driven by a voltage supply ($V_{supp}$) of 10 volts. The positive non-inverting input of the op-amp 42 includes a voltage divider formed by resistors R9 (4.7 KΩ) and R10 (300Ω). The voltage divider receives a five volt (5V) supply that generates a reference voltage ($V_{ref}$) of about 0.3 volts at the positive input of the op-amp 42. The negative inverting input of the op-amp 42 is coupled to the feedback loop, as well as resistor R8 (511Ω) which is coupled to sense resistor $R_{sense}$.

The channel selection circuit 32 is coupled between the driver/switching circuit 24 and the current limiting circuit 30 and acts as a channel selection device which eliminates the need for a separate current limiting circuit 30 for each separate transistor 34 in the driver/switching circuit 24. The channel selection circuit 32 includes the plurality of diodes D1–D6 corresponding to the number of transistors 34 used in the driver/switching circuit 24. The anode of each diode D1–D6 is coupled to a gate of one of the transistors 34 while the cathode of each diode D1–D6 is coupled to the output of the op-amp 42. Each diode D1–D6 will couple the current limiting circuit 30 to each transistor 34 when the particular diode D1–D6 is forward biased. When the diodes D1–D6 are reverse biased, the current limiting circuit 30 is not current regulating or limiting the current through the ignition coils 38.

In operation, when the RPM of the internal combustion engine 14 is greater than a threshold level of about 600 RPM, the pulse width of each timing pulse 16 ($T_{p1}$, $T_{p2}$, . . . , $T_{p6}$) generated by the controller 12 is a function of the battery voltage ($V_{batt}$) 40 and independent of the RPM of the internal combustion engine 14. Should the battery voltage be at a higher voltage level, the pulse width for the particular timing pulse 16 would be shorter than if the battery voltage is at a lower voltage. In other words, with a lower voltage, the pulse width of the timing pulse 16 would be required to be on longer to achieve the desired amount of current through the primary ignition coils ($L_{p1}$, $L_{p2}$. . . , $L_{p6}$). With a higher voltage, the pulse width may be shorter and still achieve the desired amount of current through the primary ignition coils ($L_{p1}$, $L_{p2}$, . . . , $L_{p6}$) at the instant of the firing of the spark plug 22. To compensate for this variation in battery voltage ($V_{batt}$) the controller 12 will adjust the dwell time accordingly. The dwell time is defined as the width of the pulses $T_{p1}$–$T_{p6}$ in time. The microcontroller 12 sets the positive edge of the pulses $T_{p1}$–$T_{p6}$ such that the negative edge occurs at 9° before top dead center (TDC) of the crankshaft 41.

Figure 6:
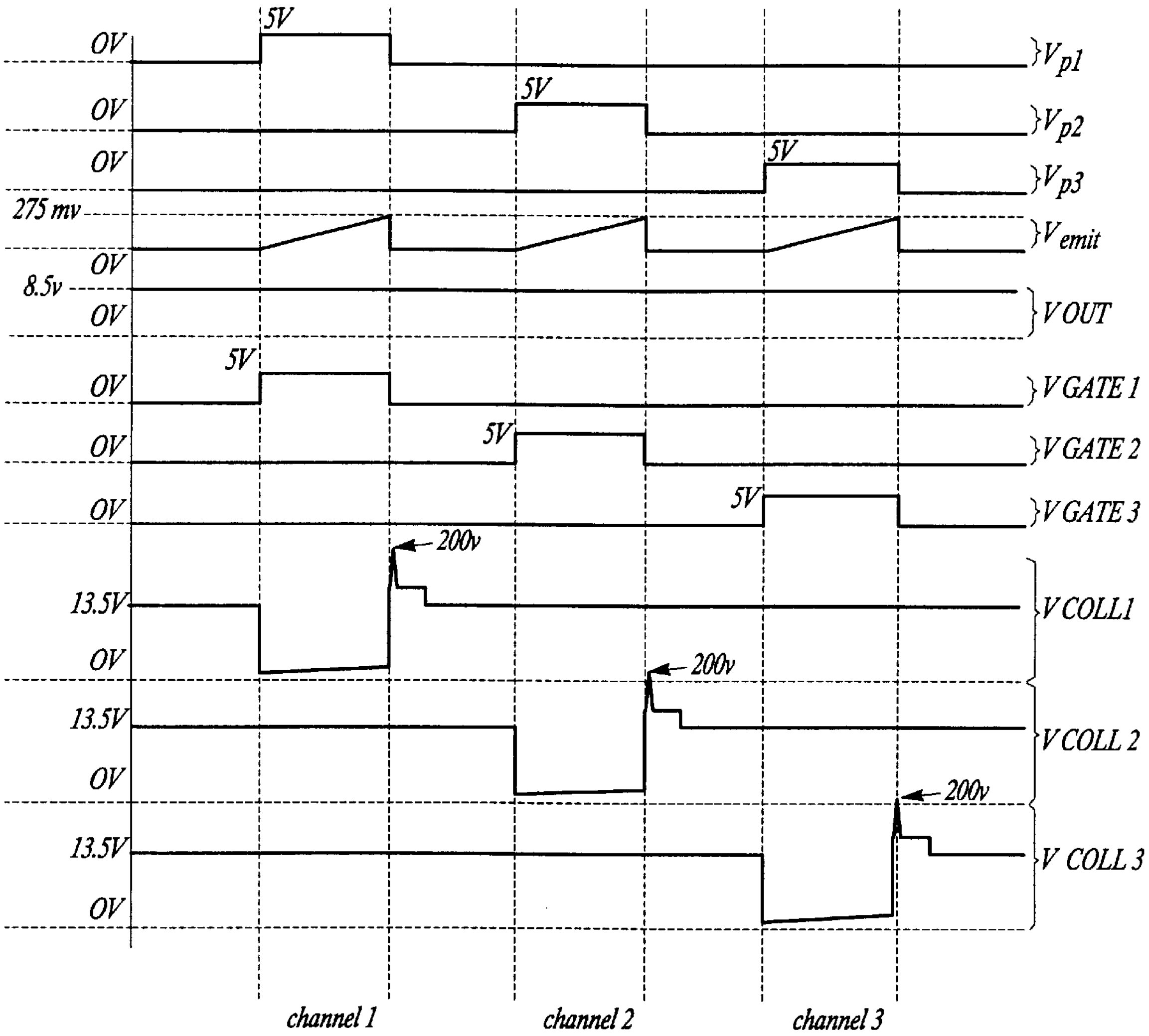
FIG. 6 is a timing diagram showing the operation of the multichannel ignition circuit of FIG. 1 at internal combustion engine revolutions greater than 600 RPM.

Referring specifically to channel 1, when timing pulse $T_{p1}$ is generated by the controller 12, the timing pulse $T_{p1}$, which has an amplitude of about 5 Volt, turns on the transistor $IGBT_1$ by driving the $IGBT_1$ into saturation. With the transistor $IGBT_1$ in saturation, current sourced from the battery 40 starts to flow through the primary ignition coil $L_{p1}$, through transistor IGBT, and into voltage sense circuit 28. As the increasing current l(t) flows through sense resistor $R_{sense}$, the sense voltage at $v_{emit}$ is applied to the inverting input of the op-amp 42 through resistor R8. At this higher RPM (>600 RPM), the pulse width of the timing pulse $T_{p1}$ is never high (5V) long enough for the voltage at the inverting input of the op-amp 42 to increase above 0.3 volts. As long as this voltage is less than 0.3 volts, the op-amp 42 will not turn on and always be in saturation. Since the op-amp 42 is in saturation, the output voltage $V_{out}$ will be approximately equal to the supply voltage $V_{supp}$ less about 1.5 volts. In other words, $V_{out}$ will be at approximately 8.5 volts which is positioned at the cathode of diode D1. Since the anode of the diode D1 is at about 5 volts, diode D1 is reverse biased and the current limiting circuit 30 and the channel select circuit 32 are essentially "out of the multichannel circuit 10" and thus not used above 600 RPM (see FIG. 6 for timing diagrams for operation above 600 RPM). The software of the controller 12 ensures that when the internal combustion engine 14 operates above 600 RPM, the pulse width of each timing pulse 16 ($T_{p1}$, $T_{p2}$, . . . , $T_{p6}$) is never on long enough to drive the current limiting circuit 30 into a regulation mode.

Below 600 RPM, the positive edge of the pulse $T_{p1}$ starts at 49° before TDC of the corresponding crankshaft 41 and the negative edge occurs at 9° before TDC of the corresponding crankshaft 41. The process in the case of the pulses $T_{p2}$–$T_{p6}$ is similar to the case of pulse $T_{p1}$. At speeds of the internal combustion engine 14 less than 600 RPM the controller 12 cannot calculate the width of the pulse $T_{p1}$ because the speed of the crankshaft 41 is not constant at low RPM. The large number of degrees of the rotation of the crankshaft (49°–9°) ensures, however, that the resulting pulse width $T_{p1}$ is always much greater than the $T_{p1}$ pulse width at crankshaft 41 speeds greater than 600 RPM. Thus, the current limiting circuit 30 is necessary to ensure that the current through the coils 38 ($L_{p1}$, $L_{p2}$, . . . , $L_{p6}$) is limited to approximately 7 amps. With the increased pulse width below 600 RPM of the timing pulse 16, the current l(t) through resistor $R_{sense}$ is able to increase so that the voltage at the inverting input to the op-amp 42 exceeds 0.3 volts. When this occurs, the op-amp 42 will come out of saturation and $V_{out}$ will decrease to about 2 volts, such that the diode D1 will now be forward biased to enable the current limiting circuit 30 to start current regulating. With the current limiting circuit 30 operating, the gate voltage at $IGBT_1$ is pulled down from about 5 volts to about 2.7 volts. This lower gate voltage at transistor $IGBT_1$ puts transistor $IGBT_1$ into a linear mode. This linear mode will limit the amount of current flowing through the primary ignition coil $L_{p1}$, to about 7.5 amps, thereby preventing too high a current from being generated in the primary ignition coil $L_{p1}$ should there be a significant delay before top dead center occurs.

Figure 2:
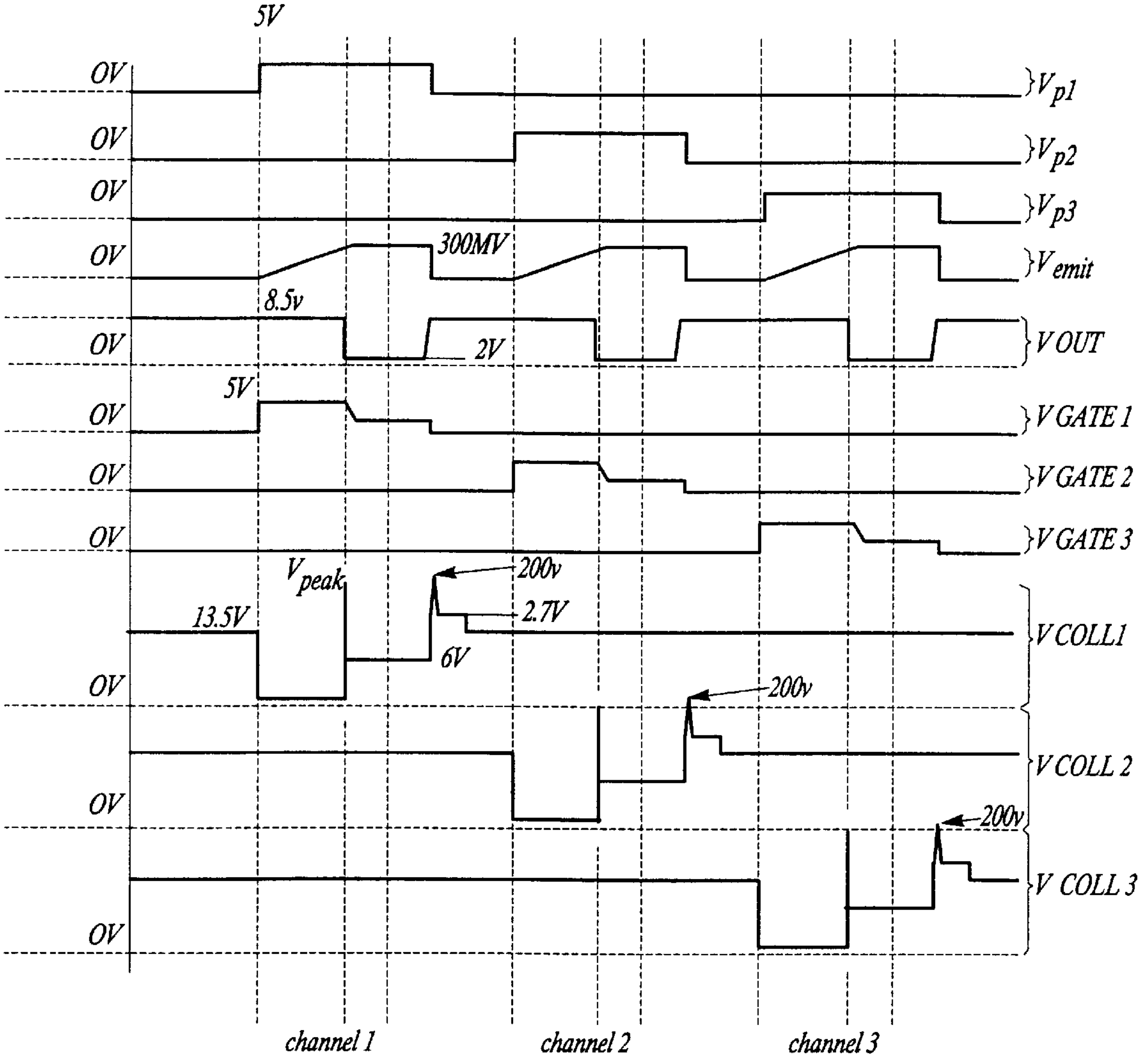
FIG. 2 is a timing diagram showing the operation of the multichannel ignition circuit of FIG. 1 at engine revolutions less than 600 RPM.

Referring to FIG. 2, a timing waveform diagram illustrating the operation of the multichannel ignition circuit 10 when the RPM of the internal combustion engine 14 is below 600 RPM is shown. It should be noted that the timing diagram in FIG. 2 only illustrates channels 1, 2 and 3 of the ignition circuit 10 and, of course, channels 4, 5 and 6 will operate similar to channels 1, 2 and 3. Referring specifically to channel 1, the voltage $V_{emit}$, which is the voltage at the emitter of $IGBT_1$ and at the resistor $R_{sense}$, is shown increasing as the timing pulse $T_{p1}$ is on and the current I(t) is increasing in the primary ignition coil $L_{p1}$. When the voltage $V_{emit}$ reaches 0.3 volts, the current Limiting circuit 30 goes into regulation and $V_{out}$ of the op-amp 42 drops from about 8.5 volts to about 2 volts. This drop in voltage at $V_{out}$ forward biases diode D1 and causes the gate voltage $V_{gate1}$ to drop from about 5 volts to about 2.7 volts, thereby placing transistor $IGBT_1$ into linear mode. This causes the collector voltage $V_{coll1}$ in the transistor $IGBT_1$ to go from about the voltage $V_{emit}$ plus $V_{IGBT}$ saturated (approximately 1V) to about 6 volts after about a 40 volt spike ($V_{peak}$). The current Limiting circuit 30 limits the current in the primary ignition coil $L_{p1}$ to about 7.5 amps which will be maintained until the crankshaft is at 9° before top dead center (TDC). At 9° before TDC, the timing pulse $T_{p1}$ ends, as exhibited by the gate voltage $V_{gate1}$. $IGBT_1$ turns off, $V_{emit}$ goes to zero causing $V_{out}$ to go to 8.5V and thus causing diode $D_1$ again to be reverse biased. The firing of the spark plug 22 occurs when the timing pulse 16 ends, shown by the resultant 200 volt peak at $V_{coll1}$.

The multichannel ignition circuit 10 eliminates the requirement of having a separate current limiting circuit 30 for each transistor 34 in the driving/switching circuit 24, via the channel selection circuit 32. However, one drawback with the multichannel ignition circuit 10 is the peak voltage ($V_{peak}$) occurring at the collector of the transistor $IGBT_1$ when the transistor $IGBT_1$ goes from a saturation mode to a linear mode and the timing pulse 16 is on. This 40 volt spike creates a 4000 volt spike at the secondary ignition coil $L_{s2}$ which could cause early misfiring of the spark plug 22.

Because $V_{out}$ is initially at about 8.5 volts, it has to drop to about 2.7 volts less one diode drop through diode D1 (i.e., 0.7 volts) before transistor $IGBT_1$ is regulated. When the transistor $IGBT_1$ comes out of saturation and begins to regulate, too much current is in the primary ignition coil $L_{p1}$. As the current decreases sharply in primary ignition coil $L_{p1}$, the current change (di/dt) is negative and L(di/dt) at the bottom of the primary ignition coil $L_{p1}$ jumps to about 40 volts before decaying to about 6 volts.

Figure 3:
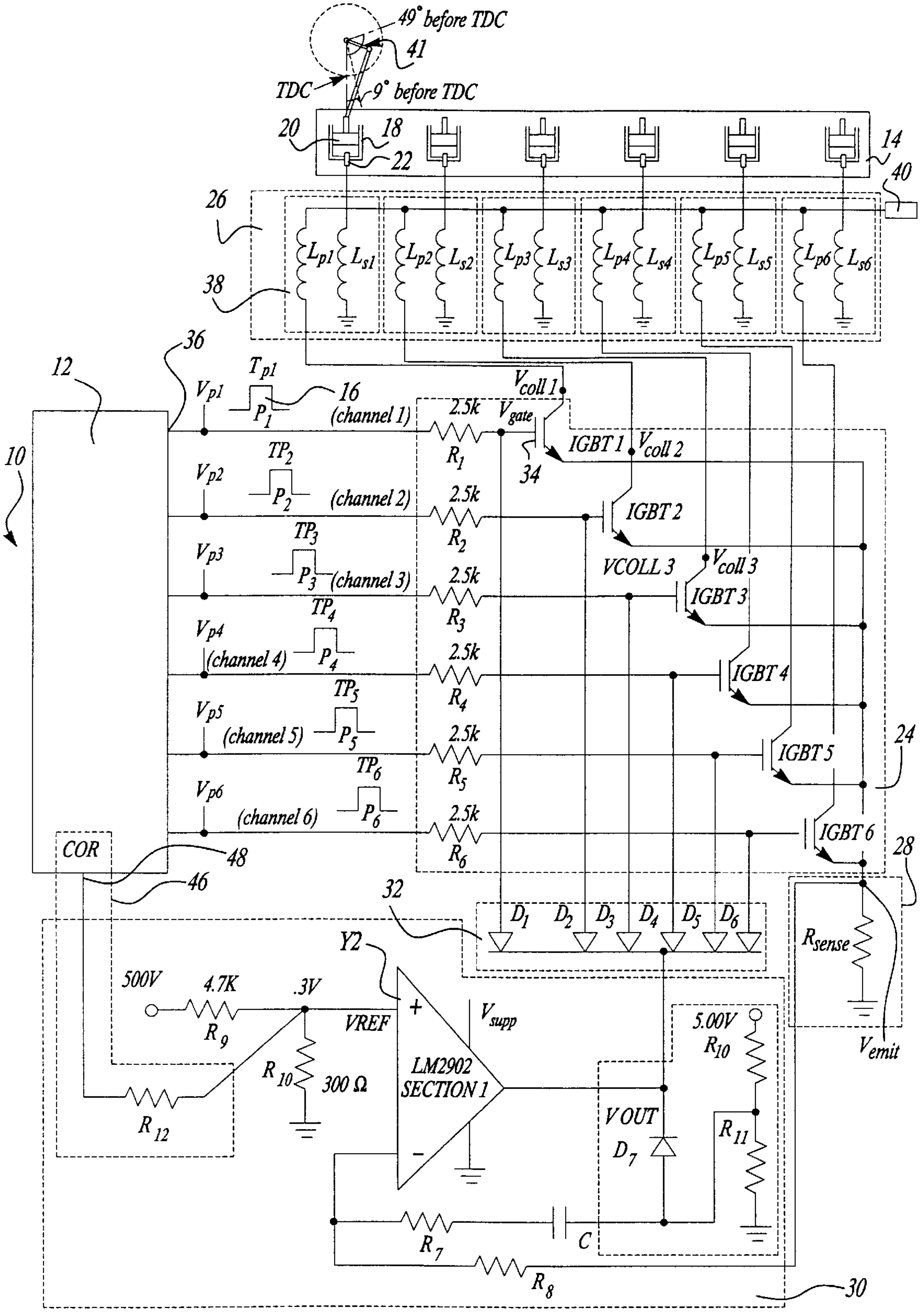
FIG. 3 is a detailed schematic block diagram of a multichannel ignition circuit according to the teachings of a second preferred embodiment of the present invention.

In order to reduce this voltage peak ($V_{peak}$), thereby eliminating the potential for early firing of the spark plug 22 while the timing pulse is still on, resistors R10 (1KΩ), R11 (4KΩ) and diode D7 are added to the current limiting circuit 30, as shown in FIG. 3. The multichannel ignition circuit 10' in FIG. 3 is essentially the same as the multichannel ignition circuit 10 in FIG. 1, except for the noted differences. In this regard, like reference numerals will be used to identify like structures with respect to the multichannel ignition circuit 10 in FIG. 1.

The peak voltage reduction circuit 44 formed by resistors R10, R11 and D7 reduces the voltage peak $V_{peak}$ from about 40 volts to approximately $1.2\times V_{batt}$. Resistors R10 and R11 act as a voltage divider. With a 5 volt supply applied to resistor R10, the anode of diode D7 sees approximately 4 volts. Thus, the junction of the capacitor C, $D_7$, $R_{10}$, and $R_{11}$ is held to 4 volts when voltage $V_{out}$ is at $V_{Supp}$−1.5 v or approximately 8.5 volts. In this condition, diode D7 is reverse biased until $V_{out}$(t)=(4−0.7) volts. In this way, capacitor C only needs to be discharged now from 4 volts to $V_{reg}$ which is the output voltage of op-amp 42 when the current limiting circuit 30 is in regulation. Thus, when the current limiting circuit 30 is in regulation, D7 which is now forward biased becomes part of the feedback loop and capacitor C instead of having to drop from approximately 8.5 volts to 2.5 volts now is only required to drop from about 4 volts to about 2.5 volts, thereby reducing $V_{peak}$ to approximately 1.2 volts$\times V_{batt}$, as shown in FIG. 4.

Figure 4:
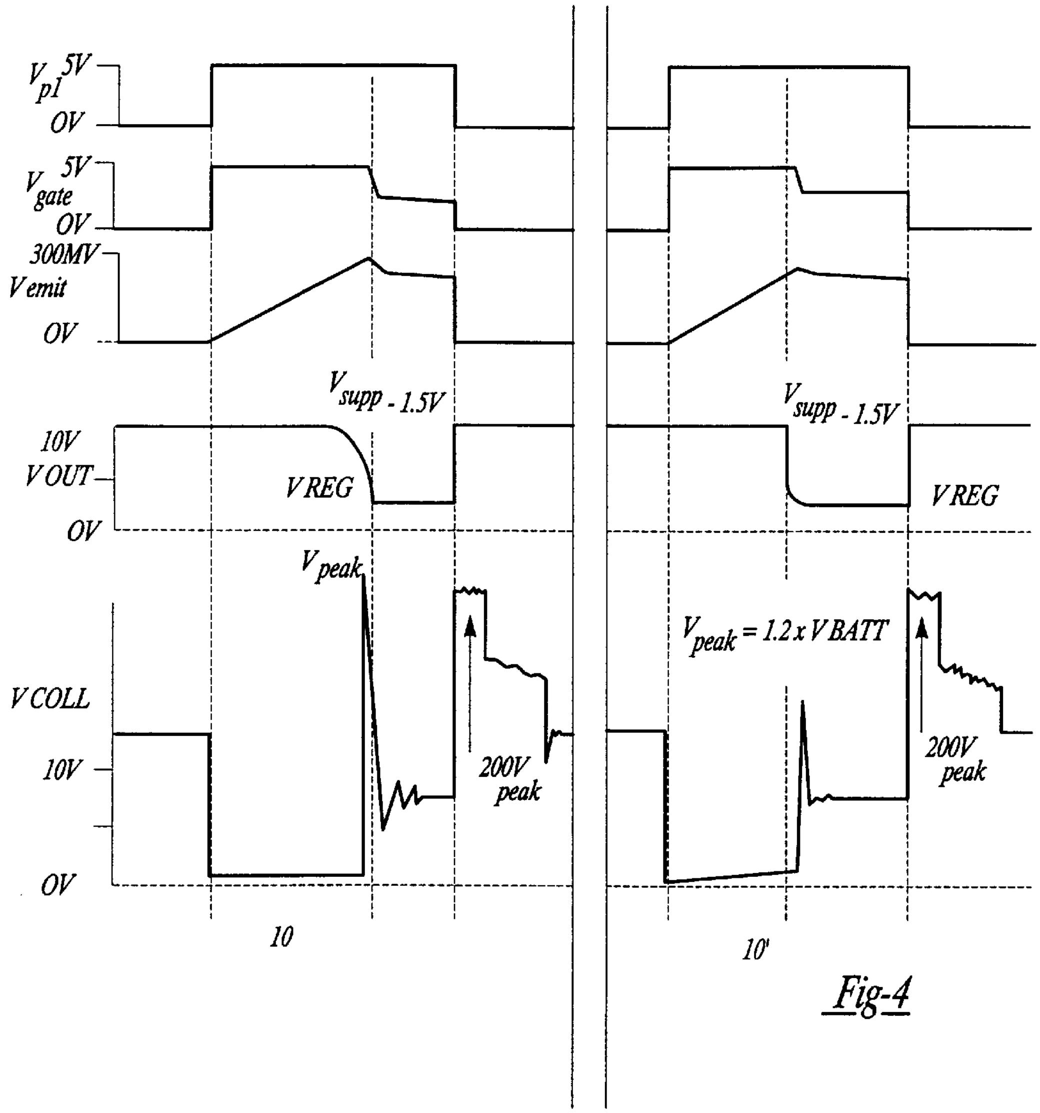
FIG. 4 is a timing diagram comparing the operation of the multichannel ignition circuit of FIG. 1 and the multichannel ignition circuit of FIG. 3.

In this regard, FIG. 4 compares the voltage at the collector $V_{coll1}$ of the transistor $IGBT_1$ in multichannel ignition circuit 10 versus the voltage at the collector $V_{coll1}$ in $IGBT_1$ in the multichannel ignition circuit 10' having the peak reduction circuitry 44. As can readily be observed, $V_{peak}$ at $V_{coll1}$ when the current limiting circuit 30 goes into regulation is reduced from a $V_{peak}$ of approximately 40 volts to a $V_{peak}$ of approximately $1.2\times V_{batt}$ or a voltage of about 16 volts. Accordingly, the voltage at the secondary ignition coil $L_{s1}$ is significantly reduced from about 4000 volts to 1600 volts, thereby substantially eliminating the peak voltage $V_{peak}$ and a potential for misfiring while the timing pulse is still on.

Figure 5:
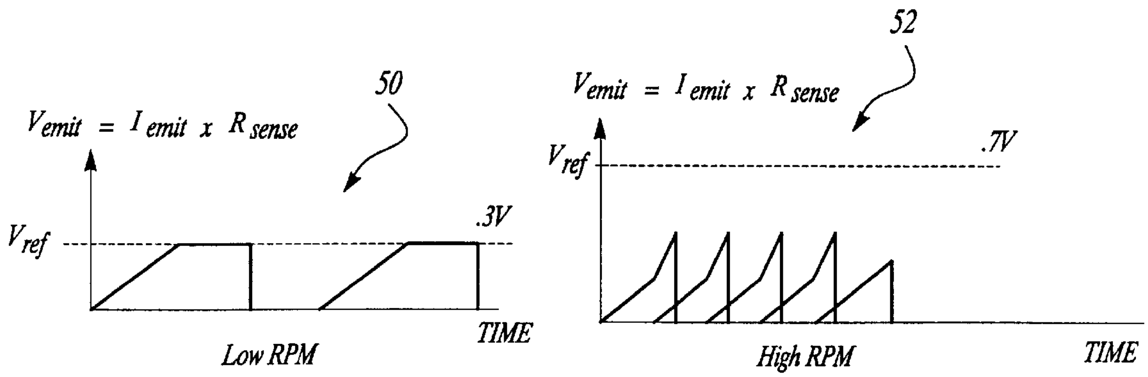
FIG. 5 is a graph of voltage versus time during low and high RPM when a current overrun circuit is employed in the multichannel ignition circuit of FIG. 3.

Finally, the multichannel ignition circuit 10' is modified to also include a current overrun circuit 46 which consists of a current overrun line 48 from the controller 12 and a resistor R12 (4.7 KΩ). Referring to FIG. 5, when the controller 12 sets the timing pulses 16 ($T_{p1}$, $T_{P2}$, . . . $T_{p6}$) to a fixed value at an RPM level below 600 RPM so as to cause the multichannel ignition circuit 10' to go into regulation, the current overrun line 48 is also set low by the controller 12, simultaneously. When the current overrun line 48 is set low, voltage $V_{ref}$=0.3 volts, as shown in graph 50. As the voltage at $R_{sense}$ increases and reaches the 0.3 volt level, the current limiting circuit 30 becomes operational because the diode D1 is now forward biased. At higher RPM greater than 600, the current overrun line 48 is set high such that $V_{ref}$=0.7 volts. At the high RPM>5000 RPM and high battery voltage, there exists current overlap in the resistor $R_{sense}$, as shown in graph 52. Accordingly, $I_{peak}\times R_{sense}$ at certain points is greater than 0.3 volts. By setting $V_{ref}$=to 0.7 volts at high RPM, the multichannel ignition circuit 10' operates properly and does not run into regulation at the high RPM.

The multichannel ignition circuit 10' thus reduces the number of current limiting circuits 30 to a single current limiting circuit which is coupled to the driver/switching circuit 24, via the channel circuit 32 to reduce overall system cost, weight and complexity. Additionally, the multichannel ignition circuit 10' further includes the peak voltage reduction circuit 44 which substantially reduces or eliminates $V_{peak}$ through the primary ignition coils $L_{p1}, L_{p2}, \ldots, L_{p6}$) when the timing pulse 16 is still on, thereby substantially reducing or eliminating a potential for spark plug misfiring. Moreover, the multichannel ignition circuit 10' also includes the current overrun circuit 46 which further eliminates the potential for the current limiting circuit 30 to go into regulation at high RPM when this is not needed. Accordingly, the multichannel ignition circuit 10' substantially reduces or eliminates the disadvantages associated with currently available ignition circuits.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A multichannel ignition circuit for controlling a supply of current to a plurality of ignition coils for use with an internal combustion engine, each of the ignition coils including a primary coil and a secondary coil, said multichannel ignition circuit comprising:

a controller operable to generate a plurality of ignition timing pulses;

a driver/switching circuit having a plurality of drivers, each of said drivers operable to be turned on upon receipt of one of said ignition timing pulses from said controller, each of the ignition coils operable to generate a firing voltage upon one of said drivers being turned on;

a current limiting circuit operable to regulate an amount of current through each of the ignition coils when the internal combustion engine is operating below a threshold, said current limiting circuit includes an operational amplifier having a feedback loop that includes a capacitor C; and a peak voltage reduction circuit forming a part of said current limiting circuit, said peak voltage reduction circuit operable to reduce voltage peaks in each of the ignition coils when said current limiting circuit is regulating the amount of current through each of the ignition coils and one of said ignition timing pulses is on, said peak voltage reduction circuit includes a voltage divider formed by a first resistor and a second resistor and a diode in said feedback loop of said operational amplifier, wherein said peak voltage reduction circuit reduces the charge on said capacitor C.

2. The multichannel ignition circuit as defined in claim 1 wherein each of said drivers is an insulated gate bipolar transistor.

3. The multichannel ignition circuit as defined in claim 1 further comprising a channel selection circuit operable to enable said current limiting circuit to regulate the current through each of the ignition coils.

4. The multichannel ignition circuit as defined in claim 3 further comprising a voltage sense circuit operable to sense an amount of current passing through the ignition coils, wherein when a voltage at said voltage sense circuit is above a voltage threshold, said channel selection circuit enables communication of said current limiting circuit with one of said drivers to limit the current through one of the ignition coils.

5. The multichannel ignition circuit as defined in claim 1 wherein said threshold is 600 revolutions per minute.

6. The multichannel ignition circuit as defined in claim 1 further comprising a current overrun circuit operable to inhibit said current limiting circuit from regulating current in the ignition coils when said threshold exceeds 600 revolutions per minute.

7. A multichannel ignition circuit for controlling the supply of current to a plurality of ignition coils for use with an internal combustion engine, each of the ignition coils including a primary coil and a secondary coil, said multichannel ignition circuit comprising:

a controller operable to generate a plurality of ignition timing pulses;

a driver/switching circuit having a plurality of drivers, each of said drivers having a control line and operable to be turned on upon receipt of one of said ignition timing pulses on said control line from said controller, each of the ignition coils operable to generate a firing voltage upon one of said drivers being turned on;

a current limiting circuit operable to regulate an amount of current through each of the ignition coils when the internal combustion engine is operating below a first RPM threshold, said current limiting circuit includes an operational amplifier having a feedback path having a capacitor C;

a channel selection circuit operable to enable said current limiting circuit to regulate current through each of the ignition coils, said channel selection circuit including a plurality of diodes, each of said diodes coupled to one of said control lines; and a peak voltage reduction circuit forming a part of said current limiting circuit, said peak voltage reduction circuit in communication with each of said diodes of said channel selection circuit, said peak voltage reduction circuit operable to reduce voltage peaks in each of the ignition coils when said current limiting circuit is regulating the amount of current through each of the ignition coils and one of said timing pulses is on, wherein said peak voltage reduction circuit reduces the overall charge on said capacitor C in said feedback path of said operational amplifier.

8. The multichannel ignition circuit as defined in claim 7 wherein said drivers are insulated gate bipolar transistors.

9. The multichannel ignition circuit as defined in claim 8 wherein when each of said drivers is on, each of said insulated gate bipolar transistors is in a saturation mode and wherein when said current limiting circuit regulates current through each of said ignition coils, each of said insulated gate bipolar transistors is in linear mode.

* * * * *